United States Patent [19]
Wagner

[11] Patent Number: 4,869,337
[45] Date of Patent: Sep. 26, 1989

[54] BACKHOE CREEP LEVER MECHANISM FOR AN EXCAVATING VEHICLE

[75] Inventor: Oryn B. Wagner, Bismarck, N. Dak.

[73] Assignee: Clark Equipment Company, South Bend, Ind.

[21] Appl. No.: 109,281

[22] Filed: Oct. 15, 1987

[51] Int. Cl.[4] .......................... B60K 26/00; B62D 1/02
[52] U.S. Cl. .................................... 180/330; 180/335; 74/482
[58] Field of Search ............... 180/320, 321, 323, 330, 180/331, 335; 74/481, 482

[56] References Cited

U.S. PATENT DOCUMENTS

| | | | |
|---|---|---|---|
| 1,833,458 | 11/1931 | Giuffre | 74/481 |
| 2,529,192 | 11/1950 | Rossner | 180/89 |
| 2,694,460 | 11/1954 | Lehmann | 180/77 |
| 3,168,933 | 2/1965 | Thorner | 180/82.1 |
| 3,195,913 | 7/1965 | Hallsworth | 280/87 |
| 3,223,193 | 12/1965 | Reynolds et al. | 180/77 |
| 3,237,478 | 3/1966 | Jewell | 74/513 |
| 3,257,013 | 6/1966 | Arnold | 180/331 |
| 3,985,039 | 10/1976 | Federspiel | 74/481 |

Primary Examiner—Kenneth R. Rice
Attorney, Agent, or Firm—Kinney & Lange

[57] ABSTRACT

An excavating vehicle includes an operator compartment, a front end loader, a backhoe and a hydrostatic drive having a hydraulic pump. An operator seat is mounted in the operator compartment and rotates between a drive position facing the front end loader, and a backhoe control position facing the backhoe. When the seat is in its drive position, the operator controls the hydrostatic drive and drives the vehicle by actuating a foot pedal mounted in the front of the operator compartment and coupled to the hydrostatic drive by a linkage. Backhoe control levers and a creep lever are pivotally mounted in the back of the operator compartment at a location accessible to the operator when the operator seat is in the backhoe control position. A bell crank is movably mounted adjacent the creep lever and is coupled to the foot pedal by a linkage mechanism.

23 Claims, 5 Drawing Sheets

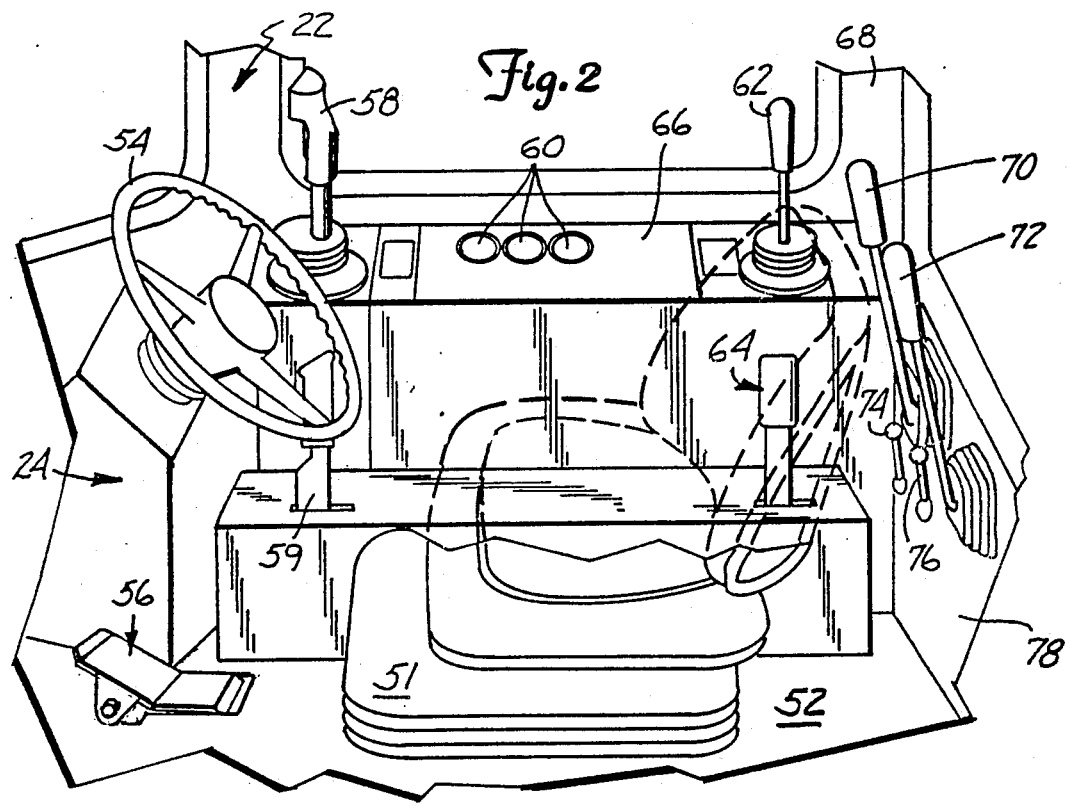
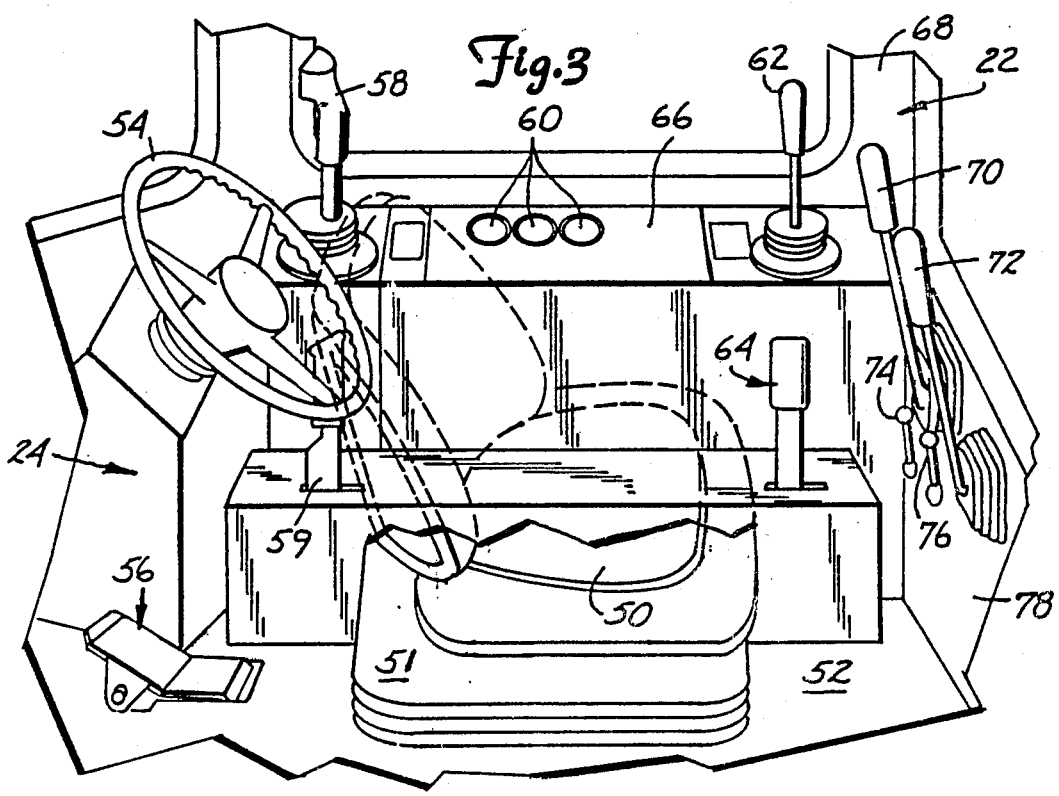

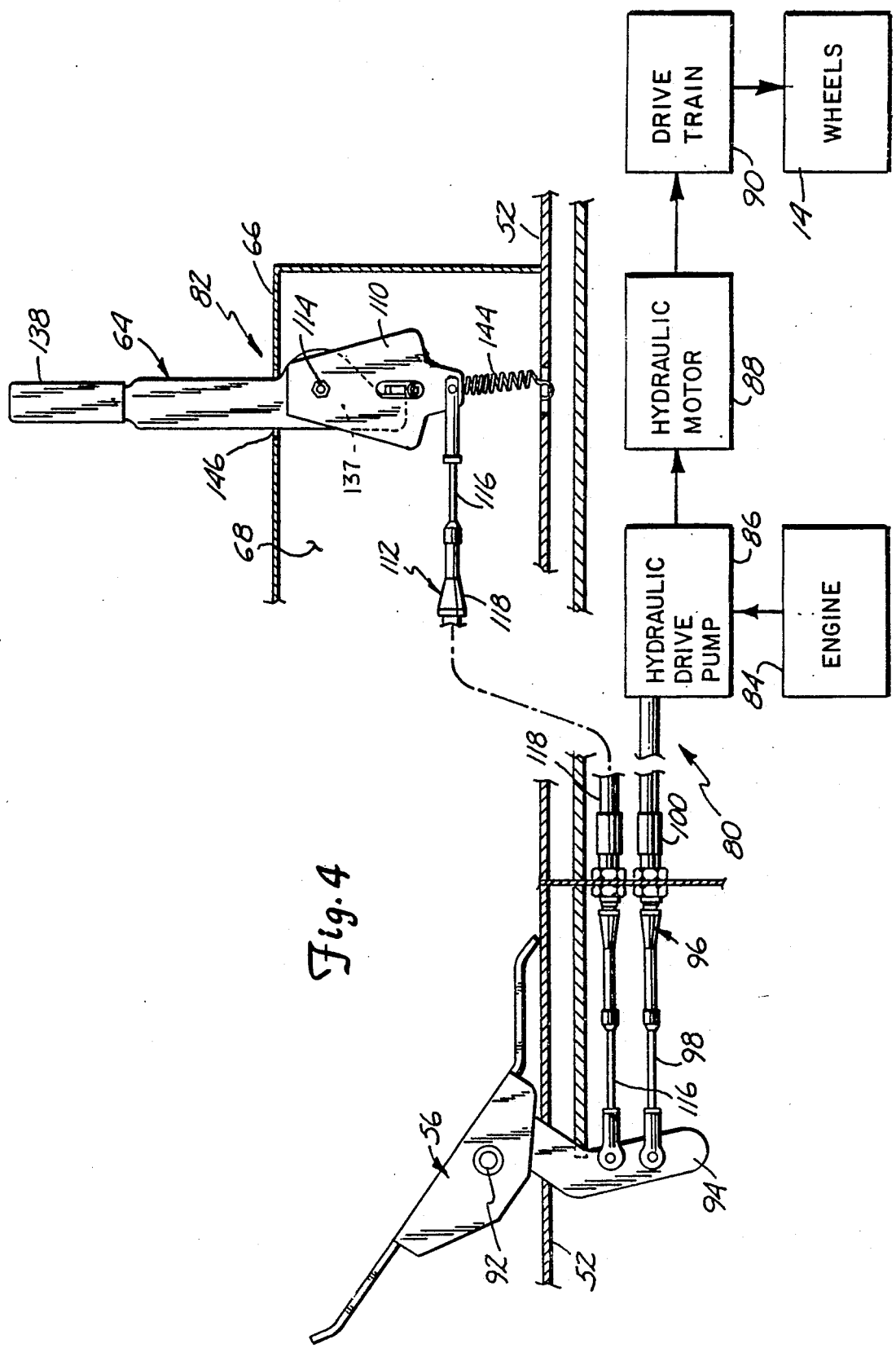

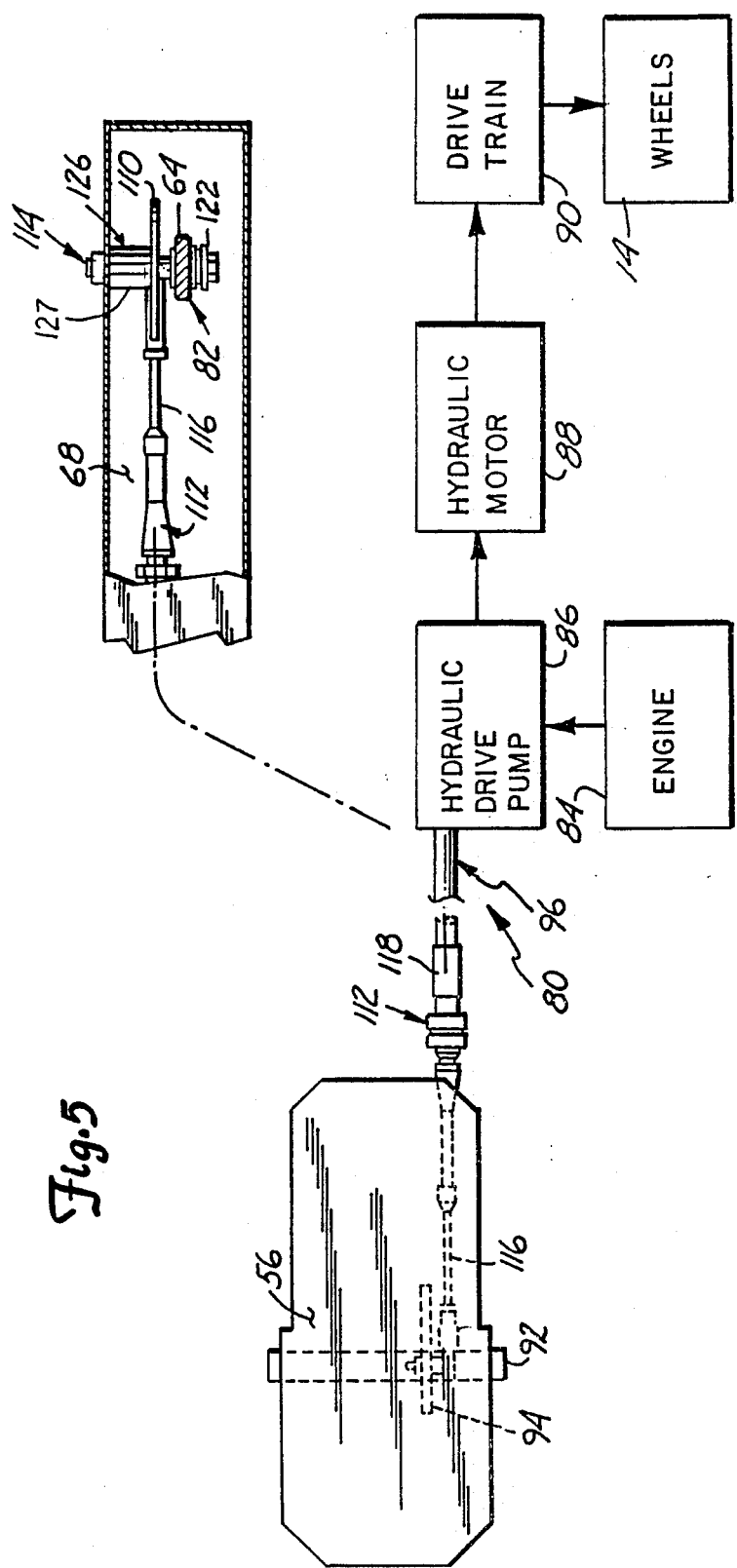

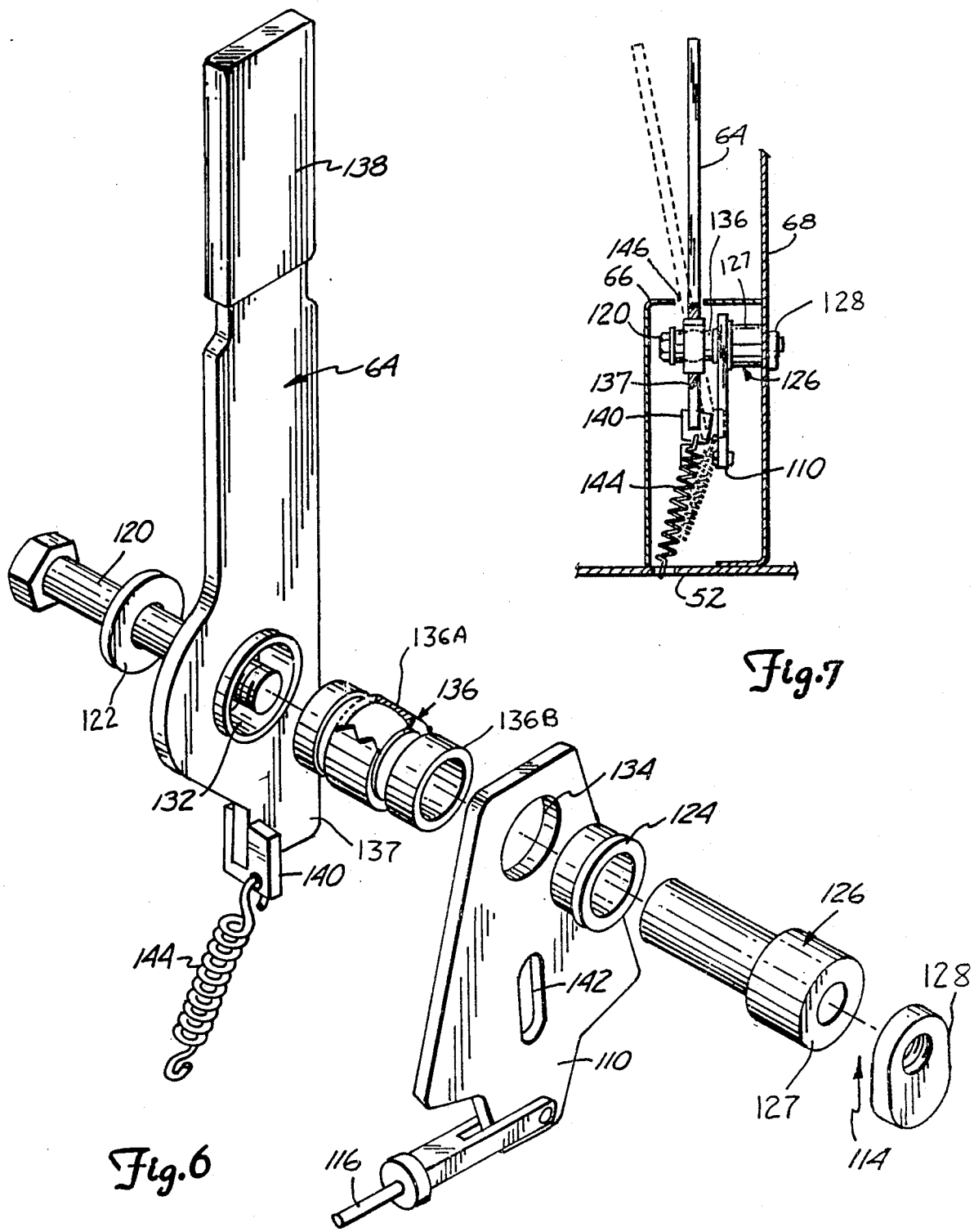

BACKHOE CREEP LEVER MECHANISM FOR AN EXCAVATING VEHICLE

BACKGROUND OF THE INVENTION

1. Field of the Invention

The present invention relates generally to drive mechanisms for vehicles having attachments on their back end. In particular, the present invention is a creep lever mechanism for driving an excavating vehicle having a backhoe mounted to the back end, while the operator seat is rotated toward the back of the vehicle to permit control of the backhoe.

2. Description of the Prior Art

Excavating vehicles of the type having a front end loader on their forward end and an attachment such as a backhoe mounted to the rearward end are well known and in widespread use. The operator compartment in these vehicles typically includes a seat which can be rotated from a drive/loader control position facing the front of the vehicle, and a backhoe control position facing the back of the vehicle. Various vehicle drive control mechanisms such as a steering wheel, foot pedal, throttle, clutch, and gear shift lever are mounted in the front of the operator compartment, as is the loader control levers. Backhoe control levers are located at the rear of the operator compartment. The operator drives the vehicle and/or actuates the front end loader when the seat is in the drive/loader control position facing the front of the vehicle. When it is desired to operate the backhoe, the vehicle is stopped and the seat rotated to the rear so the operator can access the backhoe control levers.

Many excavating vehicles of the type described above have a torque converter drive which includes a throttle, clutch, and shift lever. Still other excavating vehicles have a hydrostatic drive. Hydrostatic drives include a hydraulic drive pump which controllably supplies fluid to a hydraulic motor. The hydraulic motor is then coupled to the vehicle's wheels through a drive train. When the operator rotates the foot pedal in a counterclockwise manner, the hydraulic drive pump is stroked in a first direction causing the vehicle to be driven forward. To drive the vehicle in reverse, the operator rotates the foot pedal in a clockwise manner to stroke the hydraulic drive pump in the opposite direction. Vehicle speed in both the forward and reverse directions is determined by the extent of rotation of the foot pedal.

It is often desired to reposition or move the vehicle short distances while operating the backhoe. However, when operating the backhoe, the operator seat will be facing the back of the vehicle. This being the case, the operator does not have access to mechanisms used to drive the vehicle. In vehicles that have a torque converter drive, the operator will sometimes use the backhoe itself to push the machine around. However, operation in this manner is less than desirable. Furthermore, this technique will not work on machines having a hydrostatic drive.

It is evident that there is a continuing need for improved drive control mechanisms in excavating vehicles. Specifically, a mechanism is needed which will permit an operator to drive the vehicle while facing and controlling an attachment mounted to the back of the vehicle. The mechanism should of course be relatively uncomplicated. The mechanism should not interfere with the vehicle's primary drive mechanisms either.

SUMMARY OF THE INVENTION

The present invention is a vehicle which includes an engine and drive means for driving the vehicle with respect to ground. An operator controlled work device is mounted to the back of the vehicle. An operator compartment includes an operator seat movable between a vehicle drive position and a work device control position. Vehicle drive control means for controlling the drive means are mounted within the operator compartment at a location accessible to an operator when the operator seat is in its drive position, and inaccessible to the operator when the seat is in its work device control position. Work device control means for controlling the work device are mounted within the operator compartment at a location accessible to an operator when the operator seat is in the work device control position. Creep mechanism means mounted within the operator compartment at a location accessible to an operator when the operator seat is in its work device control position are coupled to the drive means. The operator can thereby control the drive means and make the vehicle creep or move by actuating the creep mechanism means.

In a preferred embodiment, the drive means comprises a hydrostatic drive which includes a hydraulic pump. The drive control means includes a foot pedal mounted in the operator compartment in front of the operator seat when the operator seat is in the drive position, and a drive linkage coupling the foot pedal to the hydraulic pump. The creep mechanism means includes a creep lever, and creep linkage means coupling the creep lever to the hydraulic pump.

In still other embodiments, the creep lever is releasably coupled to the hydraulic pump through the foot pedal. A bell crank is movably mounted adjacent the creep lever and coupled to the foot pedal by a linkage. The creep lever is normally biased to a position disengaged from the bell crank. The creep lever will therefore not interfere with motion of the foot pedal. If it is desired to move the excavating vehicle while operating the backhoe, the operator engages the creep lever with the bell crank, and actuates the lever to move the vehicle with respect to ground. The housing surrounding the creep lever limits the range of motion of the creep lever, and therefore the speed at which the vehicle can be driven through its actuation. The creep mechanism means is a relatively uncomplicated addition to the vehicle, yet greatly enhances its functional capabilities while the backhoe is being operated.

BRIEF DESCRIPTION OF THE DRAWINGS

FIG. 2 is a view of the interior of the operator compartment shown in FIG. 1, showing the creep lever, and the operator seat facing the front of the vehicle.

FIG. 3 is a view of the interior of the operator compartment shown in FIG. 1, showing the creep lever, and the seat facing the rear of the vehicle.

FIG. 4 is a view of the vehicle drive system with the backhoe creep lever mechanism, foot pedal, and linkages shown from the side.

FIG. 5 a view of the vehicle drive system with the backhoe creep lever mechanism, foot pedal, and linkages shown from the top.

FIG. 6 is an exploded view of the creep lever and bell crank shown in FIG. 4.

FIG. 7 is a view illustrating the creep lever in its engaged and disengaged positions with respect to the bell crank.

DETAILED DESCRIPTION OF THE PREFERRED EMBODIMENTS

Figure 1:
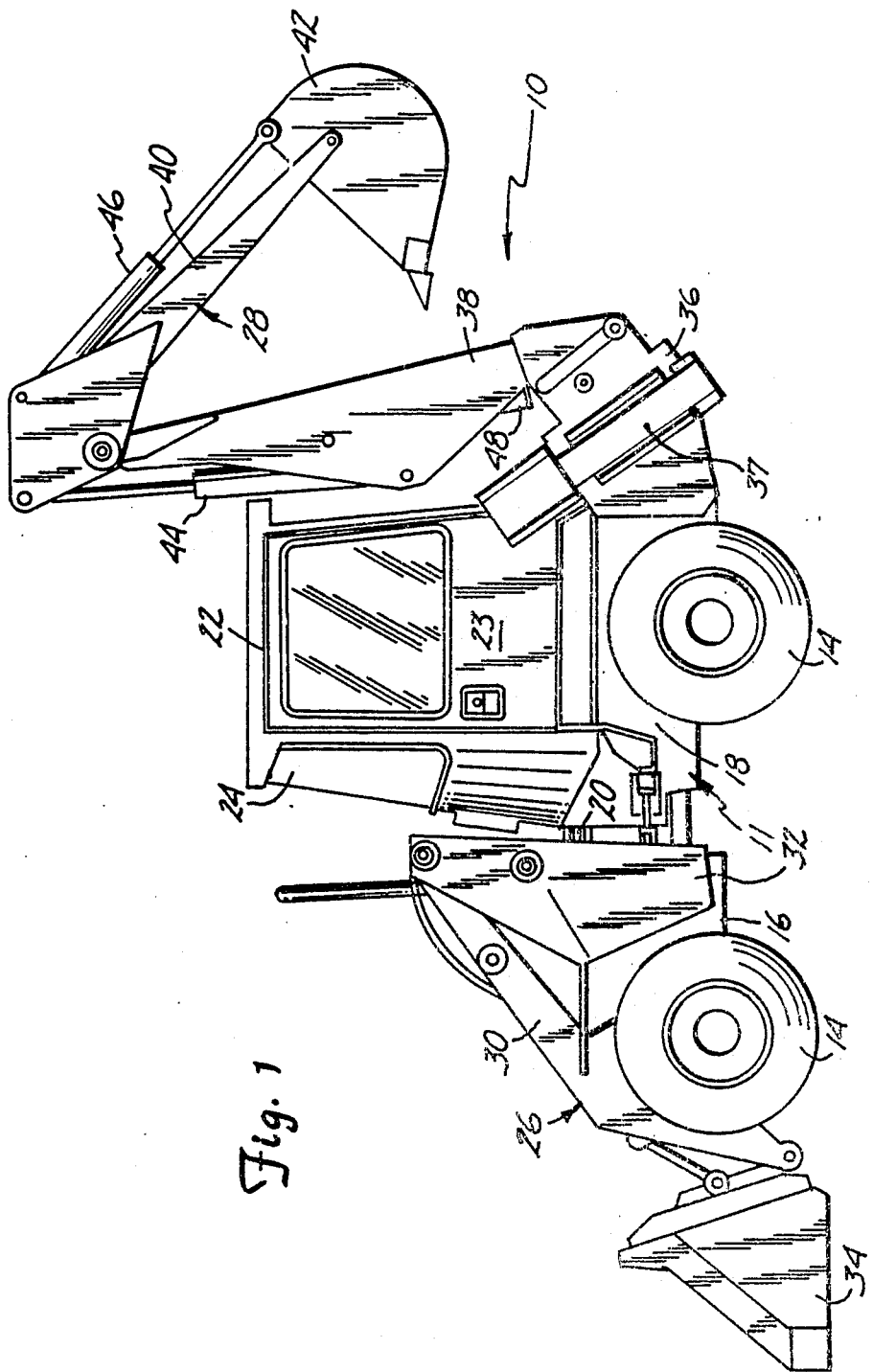
FIG. 1 is a side view of an excavating vehicle on which a backhoe creep lever mechanism in accordance with the present invention can be implemented.

An excavating vehicle 10 which includes a backhoe creep lever mechanism in accordance with the present invention is illustrated generally in FIG. 1. Backhoe creep lever mechanism 12, which is illustrated in FIG. 4 and described in detail in subsequent portions of this specification, permits an operator to make vehicle 10 creep or slowly move while operating backhoe 28. A complete understanding of backhoe creep lever mechanism 12 will be facilitated by the following general description of excavating vehicle 10.

As shown in FIG. 1, vehicle 10 includes an articulated frame 11 which is supported for over-the-ground travel by wheels 14. Frame 11 is formed by a forward frame section 16 and a rearward frame section 18 which are pivotally connected by pivot mechanism 20. Cab 22, which encloses an operator's compartment 24, is mounted to rearward frame section 18. Excavating vehicle 10 also includes a front end loader 26 and a backhoe 28.

Front end loader 26 is mounted to forward frame section 16 and includes a lift arm assembly 30 having a first end pivotally mounted to upright supports 32. Bucket 34 is pivotally mounted to a second end of lift arm assembly 30. Hydraulic lift cylinders (not visible in FIG. 1) raise and lower lift arm assembly 30 with respect to forward frame section 16 in a known manner. Bucket 34 is rotated with respect to lift arm assembly 30 by a hydraulic tilt cylinder (also not visible in FIG. 1).

Backhoe 20 is pivotally mounted to rearward frame section 18 of vehicle 10 by means of a backhoe mounting mechanism 36. One such backhoe mounting mechanism is disclosed in U.S. patent application Ser. No. 07/028,414, filed Mar. 20, 1987, which is a continuation-in-part of application Ser. No. 06/770,117 filed Aug. 27, 1985, and assigned to the same assignee as the present application. Backhoe mounting mechanism 36 includes one or more hydraulic cylinders (not visible) which rotate backhoe 28 between the upper travel position illustrated in FIG. 1, and a lower work position. Stabilizer arms 37, one of which is shown in its retracted position in FIG. 1, can be pivotally mounted to backhoe mounting mechanism 36 on opposite sides of vehicle 10.

Backhoe 28 includes boom arm 38, dipper arm 40, and bucket 42. Dipper arm 40 is driven with respect to boom arm 38 by hydraulic cylinder 44. Bucket 42 is rotated with respect to dipper arm 40 by hydraulic cylinder 46. Boom arm 38 is driven with respect to backhoe mounting mechanism 36 by hydraulic cylinder 48. Other hydraulic cylinders (not shown) swing backhoe 28 to the left and right with respect to its mounting mechanism 36.

Operator compartment 24 is entered through door 23 and is illustrated in greater detail in FIGS. 2 and 3. An operator seat 50 is pivotally mounted to floor 52 near the center of operator compartment 24, between front wall 55 and rear wall 78 of cab 22, by pivotal mount 51. Pivotal mount 51 permits seat 50 to be rotated between and locked into a first or travel/loader control position facing front wall 55, and a second or backhoe control position facing rear wall 78. Seat 50 is illustrated in its travel/loader control position in FIG. 2, and in its backhoe control position in FIG. 3.

Steering wheel 54 is mounted to and extends from front wall 55 of cab 22. Foot pedal 56 is pivotally mounted to floor 52 below steering wheel 54, and adjacent front wall 55. Other operator controls including front end loader control lever 58, throttle 59, gauges 60, backhoe mounting mechanism control lever 62, and backhoe creep lever 64 are mounted to a console 66 which is located against right wall 68 of cab 22. As shown, front end loader control lever 58 and throttle 59 are located toward the front of operator compartment 24 near front wall 55, while backhoe mounting mechanism control lever 62 and backhoe creep lever 64 are located toward the rear of the operator compartment, adjacent rear wall 78. Backhoe control levers 70 and 72, as well as stabilizer arm control levers 74 and 76 are mounted to and extend from back wall 78 of cab 22.

When seat 50 is locked into its travel/loader control position illustrated in FIG. 2, steering wheel 54, foot pedal 56, front end loader control lever 58, and throttle 59 are within reach of and accessible to the operator. The operator can therefore drive vehicle 10 and/or control front end loader 26 when seat 50 is in its travel/loader control position. As described below, vehicle 10 can include a hydrostatic drive system. Engine speed is controlled through actuation of throttle 59. Speed and direction of travel of vehicle 10 are controlled by the extent and direction of rotation of foot pedal 56. Steering is controlled by steering wheel 54. Lift arm assembly 30 and bucket 34 of front end loader 26 are controlled through actuation of front end loader control lever 58.

Backhoe 28 is operated with seat 50 locked in its backhoe control position shown in FIG. 3. Backhoe mounting mechanism 36 (FIG. 1) is controlled through actuation of mounting mechanism control lever 62. Stabilizer arm 37 is controlled through actuation of stabilizer control lever 76. A stabilizer arm on the right side of vehicle 10 (not visible) is similarly controlled through actuation of lever 74. Backhoe 28 is swung from left to right, and boom arm 38 raised and lowered, through actuation of lever 70. Dipper arm 40 and bucket 42 are controlled through actuation of lever 72. By actuating backhoe creep lever 64, the operator can also make vehicle 10 slowly move or creep in forward and rearward directions when seat 50 is in its backhoe control position.

Hydrostatic drive system 80, which includes backhoe creep lever mechanism 82 in accordance with the present invention, is illustrated generally in FIGS. 4 and 5. In addition to bachhoe creep drive mechanism 82, hydrostatic drive system 80 includes foot pedal 56, engine 84, hydraulic drive pump 86, hydraulic motor 88, drive train 90, and wheels 14. With the exception of backhoe creep lever mechanism 82, hydrostatic drive systems such as 80 are well known. Foot pedal 56 is pivotally mounted with respect to cab floor 52 by means of pivot mechanism 92. A lever arm 94 which is mounted to the back of foot pedal 56 extends below cab floor 52. Lever arm 94 is coupled to hydraulic drive pump 86 by means of a drive linkage 96. Linkage 96 includes a linkage cable 98 which has a first end connected to lever arm 94, and a second end connected to hydraulic drive pump 86. Portions of cable 98 are shielded by housing 100.

Engine 84 is mechanically coupled to and rotates hydraulic drive pump 86. Using their foot, the operator will rotate foot pedal 56 in a counterclockwise manner to drive vehicle 10 in a forward direction. This counterclockwise rotation of foot pedal 56 forces linkage cable 98 toward hydraulic drive pump 86 and strokes the pump in a first direction. In response, hydraulic drive pump 86 controls the flow of hydraulic fluid in a first direction to hydraulic motor 88. Rotational motion of hydraulic motor 88 is coupled to wheels 14 by drive train 90, causing vehicle motion in a forward direction. Drive train 90 can include a gear box, differential, and drive shafts, all of which are well known. The amount of counterclockwise rotation of foot pedal 56 controls the amount of hydraulic fluid displaced by hydraulic drive pump 86, and therefore the speed at which vehicle 10 is driven in the forward direction. Clockwise rotation of foot pedal 56 controls the speed at which vehicle 10 is driven in a reverse direction in a similar manner. When not actuated by the operator's foot, foot pedal 56 is returned to a neutral position by a bias mechanism (not shown).

Backhoe creep lever mechanism 82 includes creep lever 64, bell crank 110, and creep linkage 112. Creep lever 64 and bell crank 110 are pivotally mounted with respect to cab side wall 68 about a common rotational axis by pivot mechanism 114. Creep linkage 112 includes a linkage cable 116 which has a first end connected to lever arm 94 of foot pedal 56, and a second end connected to a lower portion 137 of bell crank 110. Portions of cable 116 are enclosed by housing 118.

Creep lever 64, bell crank 110, and pivot mechanism 114 are shown in greater detail in FIG. 6. Pivot mechanism 114 includes a bolt 120, washer 122, bushing 124, shaft 126, nut 128 and spherical bearing 136. An aperture 132 extends through lever 64 between handle 138 and lower portion 137. The axis about which creep lever 64 and bell crank 110 rotate is defined by the longitudinal axis of shaft 126. Shaft 126 extends through bushing 124, aperture 134 of bell crank 110 and inner race 136B of spherical bearing 136. Outer race 136A of bearing 136 is fit within aperture 132 of lever 64. This assembly is secured to cab side wall 68 by means of bolt 120 which extends through bearing 136 and shaft 126, and threaded into nut 128. As shown in FIG. 7, shoulder 127 of shaft 126 spaces lever 64 and bell crank 110 from side wall 68. Lever 64 is spaced from bell crank 110 yet pivotally mounted with respect thereto by bearing 136.

As perhaps best shown in FIGS. 6 and 7, creep lever 64 includes a portion 137 which extends downwardly from aperture 132 opposite handle 138. Mounted to a lower end of portion 137 is a lug 140 which extends toward bell crank 110. Lug 140 is sized and positioned to fit within aperture 142 of bell crank 110. Spring 144 has a first end connected to lug 140, and a second end connected to cab floor 52.

As a result of the cooperation between inner race 136B and outer race 136A of spherical bearing 136, creep lever 64 can be rotated in both parallel and perpendicular directions with respect to the longitudinal axis of shaft 126. When creep lever 64 is not actuated by the operator, spring 144 biases it to a generally vertical position shown in solid lines in FIG. 7 at which lug 140 is withdrawn from aperture 142 of bell crank 110. Creep lever 64 is therefore disengaged from bell crank 110.

Actuation of foot pedal 56 by the operator when driving vehicle 10 with seat 50 in its travel/loader control position will thereby be coupled to bell crank 110 by linkage 112, but will not cause any movement of creep lever 64. Creep lever mechanism 82 will not, therefore, interfere with usual action of foot pedal 56.

When operating backhoe 28 the operator will sometimes find it necessary to adjust the position of vehicle 12. Using backhoe creep lever mechanism 82, an operator will grab handle 138 and pull lever 64 toward operator seat 50. Lug 140 will then enter aperture 142, and engage bell crank 110 as illustrated in phantom in FIG. 7. Movement of creep lever 64 is then transferred to hydraulic drive pump 86 through creep linkage 112, lever arm 94, and drive linkage 96. Motion of creep lever 64 toward the front of vehicle 10 will thereby cause the vehicle to move or creep in a forward direction. Similarly, motion of creep lever 64 toward the rear of vehicle 10 will cause the vehicle to move or creep in a reverse direction. The extent of movement of creep lever 64, and therefore the speed at which vehicle 10 can be driven in its forward and rearward directions using creep lever 64, can be restrained by the length of aperture 146 through which the creep lever extends from console 66, or by other devices such as bolts.

Although the present invention has been described with reference to preferred embodiments, workers skilled in the art will recognize that changes may be made in form and detail without departing from the spirit and scope of the invention.

What is claimed is:

1. A vehicle including:
   drive means including an engine for driving the vehicle over the ground through a first range of forward and reverse speeds;
   an operator compartment;
   an operator controlled work device mounted to the rear of the vehicle;
   an operator seat mounted in the operator compartment and movable between a work device control position and a drive position;
   drive control means mounted within the operator compartment at a location accessible to an operator when the operator seat is in the drive position, and inaccessible to the operator when the seat is in the work device control position, for controlling the drive means and allowing the operator to drive the vehicle through the first range of speeds;
   work device control means mounted within the operator compartment at a location accessible to an operator when the operator seat is in the work device control position, for controlling the work device; and
   hand-receiving creep lever means at least partially mounted within the operator compartment at a location accessible by an operator's hand when the operator seat is in the work device control position, and coupled to the drive means for limited actuation of the drive means allowing the operator to drive the vehicle through a second range of forward and reverse speeds which is smaller than the first range, and reposition the vehicle in response to actuation by the operator's hand when the operator seat is in its work device control position.

2. The vehicle of claim 1 wherein the creep lever means includes:
   a creep lever mounted within the operator compartment at a location accessible by an operator; and creep linkage means coupling the creep lever to the drive means.

3. The vehicle of claim 2 wherein:
the drive means comprises a hydrostatic drive and includes a hydraulic pump; and
the drive control means includes a foot pedal mounted within the operator compartment in front of the operator seat when the operator seat is in the drive position, and a drive linkage coupling the foot pedal to the hydraulic pump.

4. The vehicle of claim 3 wherein the creep linkage means includes a linkage coupling the creep lever to the hydraulic pump.

5. The vehicle of claim 2 wherein the creep linkage means includes releasable coupling means for releasably coupling the creep lever to the drive means.

6. The vehicle of claim 5 wherein the releasable coupling means includes:
a bell crank;
a linkage coupling the bell crank to the drive means; and
pivotal engagement means for pivotally mounting the creep lever adjacent the bell crank to permit movement of the creep lever between an engaged position at which the creep lever is engaged with the bell crank, and a disengaged position at which the creep lever is disengaged from the bell crank.

7. The vehicle of claim 6 and further including biasing means for biasing the creep lever to its disengaged position.

8. The vehicle of claim 2 and further including means for limiting the range of motion of the creep lever to limit the speed at which the vehicle can be driven through actuation of the creep lever.

9. A vehicle, including:
a support structure;
a drive train including an engine for driving the vehicle in forward and rearward directions through a first range of forward and reverse speeds;
an operator compartment having a front and back;
an operator controlled work device mounted to the back of the support structure;
an operator seat mounted in the operator compartment for rotation between a drive position facing the front of the operator compartment, and a work device control position facing the back of the operator compartment;
drive controls mounted in the front of the operator compartment at a location accessible to an operator when the operator seat is in the drive position for allowing the operator to drive the vehicle through the first range of speeds;
work device controls mounted in the back of the operator compartment at a location accessible to an operator when the operator seat is in the work device control position, for controlling the work device;
a hand-receiving creep lever mounted in the rear of the operator compartment at a location accessible by an operator's hand when the operator seat is in the work device control position for allowing the operator to drive the vehicle through a second range of forward and reverse speeds which is smaller than the first range; and
a creep linkage coupling the creep lever to the drive train for actuating the drive train and causing the vehicle to be repositioned at speeds in the second range in response to actuation of the creep lever by the operator's hand.

10. The vehicle of claim 9 wherein the drive train includes:
a hydrostatic drive having a hydraulic pump; and
the drive controls include a foot pedal mounted for movement within the front of the operator compartment, and a drive linkage coupling the foot pedal to the hydraulic pump.

11. The vehicle of claim 10 wherein the creep linkage includes a linkage coupling the creep lever to the hydraulic pump.

12. The vehicle of claim 11 wherein the linkage coupling the creep lever to the hydraulic pump includes a linkage coupling the creep lever to the foot pedal.

13. The vehicle of claim 12 wherein the creep linkage includes a releasable coupling for releasably coupling the creep lever to the foot pedal.

14. The vehicle of claim 13 wherein the releasable coupling includes:
a bell crank;
a linkage coupling the bell crank to the foot pedal; and
a pivotal engagement for pivotally mounting the creep lever adjacent the bell crank to permit movement of the creep lever between an engaged position at which the creep lever is engaged with the bell crank, and a disengaged position at which the creek lever is disengaged from the bell crank.

15. The vehicle of claim 14 and further including a limiting mechanism for limiting the range of motion of the creep lever when the creep lever is engaged with the bell crank, for limiting the speed at which the vehicle can be driven through use of the creep lever.

16. The vehicle of claim 14 and further including biasing means for biasing the creep lever to its disengaged position.

17. A vehicle having front and back ends, including:
an engine:
a hydrostatic drive coupled to the engine and including a hydraulic pump, for driving the vehicle with respect to ground through a first range of forward and reverse speeds;
an operator compartment having a front and back;
an operator controlled work device mounted to the back of the vehicle;
an operator seat mounted in the operator compartment for rotation between a drive position facing the front of the operator compartment and vehicle, and a work device control position facing the back of the operator compartment and vehicle;
a foot pedal mounted in the front of the operator compartment at a location accessible to an operator when the operator seat is in the drive position;
a drive linkage coupling the foot pedal to the hydraulic pump to permit an operator to drive the vehicle through the first range of speeds by actuating the foot pedal when the operator seat is in the drive position;
work device controls mounted in the back of the operator compartment at a location accessible to an operator when the operator seat is in the work device control position, for controlling the work device;
a hand-receiving creep lever movably mounted in the back of the operator compartment at a location accessible to an operator's hand when the operator seat is in the work device control position; and a creep linkage coupling the creep lever to the hydraulic pump to permit an operator to drive the vehicle through a second range of forward and reverse speeds which is smaller than the first range to reposition the vehicle by actuating the creep lever with their hand when the operator seat is in the work device control position.

18. The vehicle of claim 17 wherein the operator controlled work device includes a backhoe.

19. The vehicle of claim 17 wherein the creep linkage includes a linkage coupling the creep lever to the foot pedal.

20. The vehicle of claim 19 wherein the creep linkage includes a releasable coupling for releasably coupling the creep lever to the linkage.

21. The vehicle of claim 20 wherein the releasable coupling includes:

a bell crank movably mounted adjacent the creep lever, the linkage being attached to the bell crank; and a pivotal engagement for pivotally mounting the creep lever adjacent the bell crank and permitting movement of the creep lever between an engaged position at which the creep lever is engaged with the bell crank, and a disengaged position at which the creep lever is disengaged from the bell crank.

22. The vehicle of claim 21 and further including a limiting mechanism for limiting the range of motion of the creep lever to limit the speed at which the vehicle can be driven.

23. The vehicle of claim 21 and further including bias means for biasing the creep lever to its disengaged position.

* * * * *